United States Patent Office 3,629,192
Patented Dec. 21, 1971

3,629,192
POLYMERS STABILIZED WITH SUBSTITUTED HYDROXYPHENYL BENZOTRIAZOLES
Hansjorg Heller, Riehen, Jean Rody, Basel, and Ernst Keller, Binningen, Basel-Land, Switzerland, assignors to J. R. Geigy AG, Basel, Switzerland
No Drawing. Division of application Ser. No. 544,834, Apr. 25, 1966, which is a continuation-in-part of applications Ser. Nos. 202,664 through 202,668, all June 15, 1962, Ser. No. 328,480, Dec. 6, 1963, and Ser. No. 535,740, Mar. 21, 1966. Divided and this application Dec. 11, 1969, Ser. No. 884,304
Claims priority, application Switzerland, June 16, 1961, 7,097/61
Int. Cl. C08b 27/68; C08f 45/60; C08g 51/60
U.S. Cl. 260—45.8         14 Claims

ABSTRACT OF THE DISCLOSURE

Light-stabilizers for polymeric light-sensitive products and materials are provided which pertain to the class of 2-(2'-hydroxyphenyl)-benzotriazoles. Compositions of the compounds and the light-sensitive materials are also provided.

This application is a divisional application of application Ser. No. 544,834, filed on Apr. 25, 1966, which is in turn a continuation-in-part of applications Ser. Nos. 202,- 664; 202,665; 202,666; 202,667 and 202,668 all filed on June 15, 1962; Ser. No. 328,480, filed Dec. 6, 1963; and Ser. No. 535,740, filed Mar. 21, 1966, all of said applications now being abandoned.

This invention relates to new substituted 2-(2'-hydroxyphenyl)-benztriazole compounds, processes for the production thereof, their use for the protection of light-sensitive organic materials, i.e. of high polymeric materials, e.g. cellulose esters, polymers of ethylenically unsaturated monomers polycondensates e.g. polyamides etc., the use of said benztriazole compounds for the production of UV filters as well as, industrial product, the organic material protected from the injurious influence of light with the aid of these substances.

Phenyl-benzotriazoles in which the phenyl moiety which is linked to the 2-position of the benzotriazole nucleus is substituted in the 5'-position by an acyl amino radical, are distinguished from the corresponding benzotriazoles free from said acylamino substituent, or having an alkyl, halogen, phenyl or cyclohexyl substituent in its place, by less tendency to sublimate, but also by an increase of the visible portion of the light absorbed by the long wavelength range, resulting in a more yellowish color. On the other hand, in the case of compounds in which such an acyl amino radical is attached to the 3'-position a considerable portion of the absorption in long-wavelength UV-range (above 320 millimicrons) is lost. Furthermore, it is desirable to have with certain materials to be stabilized, light-stabilizers which are distinguished by an equally low tendency to sublimate at normal as well as at elevated temperatures, while, at the same time showing neither substantial increase of the visible light portion nor a decrease of the long-wavelength UV-portion absorbed as compared to the unsubstituted or alkyl-substituted benzotriazole derivatives known in the art as light-stabilizers which have their absorption essentially in the invisible region of about 330 to 340 millimicrons (measured in ethanol).

It is an object of the present invention to provide light-stabilizers in the benzotriazole series which possess the last-described combination of advantageous properties.

This object as well as others that will become apparent as the description of the invention proceeds, are attained by the novel 2-(2'-hydroxy-phenyl)-benzotriazoles according to the invention, of the formula

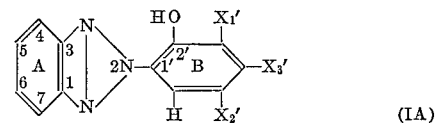

(IA)

wherein one of $X_1'$ and $X_2'$ represents a radical Z which has one of the formulas

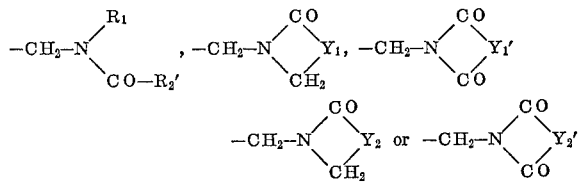

the other X of $X_1'$ and $X_2'$ as well as $X_3'$ representing hydrogen, alkyl of 1 to 5 carbon atoms, benzyl, phenylethyl, cyclopentyl, cyclohexyl, phenyl, alkoxy with 1 to 4 carbon atoms, chlorine or bromine;

$R_1'$ represents hydrogen, alkyl from 1 to 10 carbon atoms, cycloalkyl of 5 to 8 carbon atoms, mononuclear aralkyl of 7 to 10 carbon atoms, or mononuclear aryl of 6 to 11 carbon atoms;

$R_2'$ represents alkyl of 1 to 2 carbon atoms, halogenalkyl of 1 to 4 carbon atoms, alkoxyalkyl of 2 to 10 carbon atoms, aralkoxyalkyl of 8 to 10 carbon atoms, aryloxyalkyl of 7 to 12 carbon atoms, alkylmercaptoalkyl of 2 to 14 carbon atoms, aralkylmercaptoalkyl of 8 to 10 carbon atoms, arylmercaptoalkyl of 7 to 10 carbon atoms, aminoalkyl of 2 to 15 carbon atoms, carboxylalkyl with 3 to 6 carbon atoms, alkoxy-carbonyl-alkyl of 4 to 12 carbon atoms, carboxyalkylmercapto alkyl of 3 to 6 carbon atoms, alkoxycarbonyl-alkylmercaptoalkyl of 4 to 15 carbon atoms, cycloalkoxycarbonyl-alkylmercaptoalkyl of 8 to 12 carbon atoms, hydroxyalkylmercaptoalkyl of 3 to 6 carbon atoms, alkenyl of 2 to 17 carbon atoms, cycloalkyl of 5 to 8 carbon atoms, aralkyl of 7 to 10 carbon atoms, aralkenyl of 8 to 10 carbon atoms, alkoxy of 1 to 12 carbon atoms, alkylmercaptoalkoxy of 2 to 8 carbon atoms, cycloalkoxy of 6 to 8 carbon atoms, aralkoxy of 7 to 10 carbon atoms, aryloxy of 6 to 8 carbon atoms, or aryl, halogenaryl or alkylaryl, of a total of 6 to 10 carbon atoms each, each of $Y_1$ and $Y_1'$ represents an alkylene radical of 2 to 6 carbon atoms, only 2 carbon atoms of $Y_1'$ being members of the heterocyclic ring in which $Y_1'$ participates, each of $Y_2$ and $Y_2'$ represents an alkenylene radical of from 2 to 4 carbon atoms, only 2 carbon atoms of $Y_2'$ being members of the heterocyclic ring in which $Y_2'$ participates, and ring A is an unsubstituted phenylene ring or a phenylene ring substituted by chlorine; bromine; alkyl of from 1 to 4 carbon atoms; alkoxy of from 1 to 4 carbon atoms; carboxy; alkoxy carbonyl wherein the alkoxy moiety is of 1 to 4 carbon atoms; carbamyl; sulfamyl; alkylcarbamyl and -sulfamyl; wherein alkyl has from 1 to 4 carbon atoms; cyclohexyl-, benzyl-, N,N-dimethyl-, N,N-diethyl, N-methyl-N-cyclohexyl-, γ-methoxy-propylcarbamyl and -sulfamyl, piperidinyl- and/ or morpholinylcarbamyl and -sulfonyl, said substitution occurring in from one to two of the positons 3, 4 and 5 of ring A.

"Lower" as used in this specification and the appended claims in connection with aliphatic radicals denotes radicals with from 1 to 4 carbon atoms.

The above-defined benztriazoles possessing the mono-N-acyl-amino-methyl substituent in the 3'- or the 5'-position at the phenyl moiety of the 2-(2'-hydroxyphenyl)-benztriazoles according to this invention satisfy the above objects. They have improved fastness to sublimation while having a comparable, fully satisfactory light-fastness with a longer wavelength peak absorption maximum in the range of about 330 to 340 m$\mu$, as defined above.

The compounds of Formula IA are for incorporation as light stabilizers in light-sensitive addition polymers as well as condensation polymers and natural polymers or synthetic modifications thereof, but they are particularly useful in commercial application and superior to known light-stabilizers when used in small dimensional shaped polymeric materials such as sheets, foils and films of polyethylene, polypropylene, polystyrene, methylmethacrylate (plexiglass), cellulose di- to tri-acetate and polyvinylchloride.

The valuable light stabilizers according to the invention are obtained by reacting a 2-(2'-hydroxyphenyl)-benztriazole compound which can be substituted in the 3'- or 5'-position with the N-methylol compound of a carboxylic acid amide or urethane or with a functional derivative thereof which reacts in the same way as this methylol compound, to form a compound falling under Formula IA.

Benztriazole compounds which absorb particularly at long wave lengths are obtained if acidifying substituents are introduced in the ring A and basifying substituents are introduced in the 3'- and/or 5'-position. Benztriazole compounds having particularly high molar extinction in the region of 330–350 m$\mu$ are obtained if there are basifying substituents present in the 5- and/or 4'-position. The molar absorption in the range of 300 m$\mu$ is promoted by possibly further substituted alkyl substituents in the 3'-position.

Examples of basifying substituents are alkoxy groups such as the methoxy or isopropyloxy group; examples of acidifying substituents are alkylsulphonyl groups such as the methyl and ethyl sulfonyl groups; sulfonic acid amide groups such as the sulfonic acid methyl, butyl and cyclohexyl amide groups and the carboxyl group as well as its esters.

The N-methylol compounds usable according to the invention which have the formula Z—OH, wherein Z has the meaning given above in connection with Formula IA.

The reaction of the 2-(2'-hydroxyphenyl)-benztriazole compound which can be substituted in the 3'- or 5'-position with the N-methylol compound of the carbacyl amide is performed in the presence of acid condensing agents. As such can be employed principally concentrated hydrochloric acid, zinc chloride, phosphorus pentoxide, acetic acid anhydride, polyphosphoric acid and oleum. The preferred condensing agent, however, is concentrated to anhydrous sulphuric acid because it can generally also serve as solvent. The reaction temperature can vary between wide margins and depends mainly on the condensing agent used. In concentrated sulphuric acid, the reaction generally proceeds quickly and completely at room temperature.

In some cases it is necessary to perform the reaction at a raised temperature, e.g. at 40–80° C. The conditions should be so chosen, however, that no sulphonation occurs. The reaction products are separated out by pouring the sulphuric acid solutions or suspensions in ice water and isolated by filtering off or centrifuging.

The carbacyl-N-methylolamides can be replaced by their functional derivatives which react in the same way, for example by their reactive esters with acids such as, e.g. with halogen hydracids or by the bis-(carbacyl amido-methyl)-ethers. The use of carbacyl-N-methylolamides is preferred; however, because of their greater reactivity, in single cases the carbacyl-N-chloromethylamides are useful. In certain cases the process according to the invention can often be simplfied by reacting a mixture of formaldehyde and carbacyl amide instead of the methylol compounds, with a 2-(2'-hydroxyphenyl)-benztriazole which can be substituted. This reaction can be performed in one step.

A modification of the process for the production of the new 2-(2'-hydroxy-3'- or 5'-carbacyl amidomethylphenyl)-benztriazole compounds (carbacylamidometho radical here and in the following means the carboxylic acid amido and the urethane radical) consists in coupling a 2-nitro-benzene diazonium compound with a phenol containing a carbacyl amidomethyl group in the 2- or 4-position, which phenol couples in an o-position to the hydroxy group and reducing the azo compound obtained to the corresponding triazole compound.

Examples of 2-nitrobenzene diazonium compounds useable according to the invention are the diazonium compounds of the following anilines:

2-nitroaniline, 2-nitro-4- or -5-methylaniline, 2-nitro-4- or -5-ethylaniline, 2-nitro-4- or -5-methoxyaniline, 2-nitro-4- or -5-ethoxyaniline, 2-nitro-4- or -5-chloroaniline, 2-nitro-4- or -5-bromoaniline, 2-nitro-4- or -5-methylsulphonylaniline or 2-nitro-4- or -5-ethylsulphonylaniline, 2-nitro-aniline-4-sulphonic acid dimethyl amide, ethyl amide, piperidide or morpholide.

Examples of 2- or 4-carbacyl amidomethyl phenols coupling in o-position to the hydroxyl group are 2-acetamidomethyl-4-methylphenol,
4-acetamidomethyl-2-methylphenol,
2-propionylamidomethyl-4-butylphenol,
4-propionylamidomethylphenol,
4-benzoylamidomethylphenol,
2-propionylamidomethyl-4-chlorophenol, -4-bromophenol, -4-ethylphenol, -4-cyclohexylphenol, -4-methoxyphenol,
2-$\beta$-methylthiopropionylamidomethyl-4-chlorophenol, or
2-pentylcarboxylic acid amidomethyl-4-ethylphenol.

These 2- or 4-carbacyl amidomethylphenols are obtained, for example, by reaction of a phenol substituted in the 2- or 4-position with an N-methylol compound.

The 2-nitrobenzene diazonium compound is coupled with the 2- or 4-carbacyl amidomethylphenol coupling in the o-position to the hydroxyl group by methods known per se. The azo compound obtained is then reduced in the usual way to the triazole compound, e.g. with sodium sulphides, glucose or zinc dust in an alkaline medium.

A further modification of the process for the production of the benztriazole compounds according to the invention consists in acylating the amino group in a 2-(2'-hydroxy-3'- or -5'-aminomethyl-phenyl)-benztriazole.

Examples of starting materials are: 2-(2'-hydroxy-3'-aminomethyl - 5' - methylphenyl)-5-methyl-benztriazole, -5-ethyl-benztriazole, -5-methoxy-benztriazole, -5-ethoxy-benztriazole, -5-chloro-benztriazole, -5-bromo-benztriazole, 2-(2'-hydroxy-3'-aminomethyl - 5' - methyl- or -5'-ethyl- or -5'-butyl-phenyl)-benztriazole or 2-(2'-hydroxy-5'-aminomethylphenyl)-5-methoxy - 6 - methyl-benztriazole.

These starting materials are obtained, for example, by acid or alkaline saponification of the easily produced 2-(2'-hydroxy-3'- or 5'-acetamidomethyl or carbomethoxyamidomethylphenyl)-benztriazole compounds.

As acylating agents are employed, for example, anhydrides, esters (e.g. esters of low alkanols) and, preferably, halides, particularly chlorides, of carboxylic acids and carboxylic acid half esters or ketenes.

Examples of such acylating agents are the derivatives mentioned, in particular the chlorides or bromides of carboxylic acids or carboxylic acid esters.

The acylation is performed by heating the components, advantageously in an organic solvent. Suitable solvents are, in particular, aromatic hydrocarbons and their halogen substitution products such as, e.g. benzene, toluene, xylene, chlorobenzene or dichlorobenzene as well as tertiary amines, e.g. dimethylaniline or pyridine. In some cases the reaction can also be performed in aqueous medium at an almost neutral pH and with the use of weakly basic acid binding agents such as, e.g. sodium acetate.

This process is advantageously used for the production of those substituted 2-(2'-hydroxyphenyl)-benztriazole compounds according to the invention which, because of bad accessibility, bad reactivity, decomposition under the reaction conditions, difficult solubility or other unfavourable properties, of the N-methol carbacyl amides can only be obtained in the direct way with difficulty or even not at all.

In certain cases, the partial acylation at the amino group poses difficulties. It is then advantageous to double acylate the 2-(2'-hydroxy-3'- or 5'-aminophenyl)-benztriazole compounds and afterwards to partially saponify the 2-(2'-acyloxy-3'- or 5'-acylamidophenyl)benztriazole compounds obtained to the desired 2-(2'-hydroxy-3'- or 5'-acylamidophenyl)-benztriazoles. This can be done, for example, with alcoholic caustic soda lye.

A sub-group of the 2-(2'-hydroxy-3'- or 5'-carboxylic acid amidomethylphenyl)-benztriazole compounds produced according to the invention contains, in α- or β-position to the carbonyl groups, acyl radicals substituted by RO—, RS— or

groups, wherein R, R' and R'' each represents an aliphatic, cycloaliphatic, araliphatic or aromatic radical and also R' and R'' represent hydrogen or, together with the amino-nitrogen atom, also a hetero ring. These compounds are obtained by the processes described above, for example, by condensation of the methylolamides of α- or β- ether, -thioether, or -tert. aminocarboxylic acids with 2-(2'-hydroxyphenyl)-benztriazoles which contain at least one replaceable hydrogen atom in the 3'- or 5'-position. Another modification of the processes described above for the production of 2-(2'-hydroxy-3'- or 5'-carboxylic acid amidomethylphenyl)-benztriazole compounds consists in reacting such of these compounds which contain mobile substituents which can be split off as anion in α- or β-position to the carbonyl group of the acyl radical with organic hydroxyl compounds, thiole compounds or primary or secondary amino compounds or with ammonia. This reaction is performed under the usual conditions.

Examples of starting materials containing mobile substituents are the 2-(2'-hydroxy-3'-or 5'-α- or -β-halogenalkanoylamidomethylphenyl)-benztriazole compounds such as 2-(2'-hydroxy-3'-chloroacetamidomethyl- or 3'-bromoacetamidomethyl-5'-methylphenyl)-bentriazole, 2-(2'-hydroxy-3'-α-chloropropionylamidomethyl- or -3'-α-bromopropionylamidomethyl-5'-methylphenyl)-benztriazole, 2-(2'-hydroxy-3'-β-chloropropionylamidomethyl- or -3'-β-bromopropionylamidomethyl-5'-cyclohexylphenyl)-benztriazole, and 2-(2'-hydroxy-5'-chloroacetamidomethylphenyl)-5,6-dimethyl-benztriazole.

The 2-(2'-hydroxy-3'- or 5'-α- or -β-halogenalkanoylamidomethylphenyl)-benztriazole compounds are obtained, for example, by reaction of a 2-(2'-hydroxyphenyl)-benztriazole compound which can be substituted in the 3'- or 5'-position with the N-methylol compound of the corresponding α- or β-halogen fatty acid amide.

Examples of organic hydroxyl compounds employed are alcohols such as methanol, ethanol, propanol, isopropanol or butanol, β-hydroxypropionic acid methyl or ethyl ester, cyclohexanol or benzyl alcohol or phenols such as, e.g. phenol or 2-, 3- or 4- methylphenol or 2-, 3- or 4-chlorophenol.

Examples of mercaptans are: methyl or ethyl mercaptan, β-mercaptopropionic acid methyl or ethyl ester, benzyl mercaptan or phenyl mercaptan.

The following can be employed as primary or secondary amines, for example, ammonia, methylamine, ethylamine, propylamine, isopropylamine, n-butylamine, cyclohexylamine, benzylamine, aniline, dimethylamine, diethylamine, methylcyclohexylamine or piperidine.

The reaction of the 2-(2'-hydroxy-3'- or 5'- α- or -β-halogenalkanoylamidomethylphenyl) - benztriazole compound with the organic hydroxyl compound or with the mercaptan or with the primary or secondary amine is performed by heating the starting materials, e.g. in aqueous medium or in inert organic solvents in the presence of acid binding agents such as, e.g., alkali hydroxides, alkali or earth alkali carbonates or alkali metal alcoholates, phenolates or mercaptides.

Another modification of the process for the production of these 2-(2'-hydroxy-3'- or -5'-alkanoylamidomethylphenyl)- benztriazole compounds substituted in the β-position to the carbonyl group by an —OR, —SR or —NR'R'' group, consisting in adding organic hydroxyl or thiole compounds or ammonia or primary or secondary amines in the α,β-position to the carbonyl group to a 2-(2'-hydroxy-3'- or -5'- alkenoylamidomethylphenyl)benztriazole compound having an olefinic double bond.

Examples of 2-(2'-hydroxy-3'- or 5'-α,β-alkenoylamidomethylphenyl)-benztriazole compounds to which such addition can be made are:

2-(2'-hydroxy - 3' - acryloylamidomethyl-5'-cyclohexylphenyl)-benztriazole or 2-(2'-hydroxy-3'-methacryloyl-amidomethyl-5'-methylphenyl)-benztriazole, 2-(2'-hydroxy - 3' - acryloylamidomethyl - 5' - methylphenyl)-benztriazole, 2-(2'-hydroxy-3'-acryloylamidomethyl-5'-chlorophenyl)-benztriazole, 2-(2'-hydroxy - 3' - methacryloylamidomethyl-5'-chlorophenyl)-benztriazole or 2-(2'-hydroxy - 3' - α-phenylacryloylamidomethyl-5'-chlorophenyl)-benztriazole.

These 2-(2'-hydroxy-3'- or 5'-α,β-alkenoylamidomethylphenyl)-benztriazole compounds are obtained, for example, by reaction of a 2-(2'-hydroxyphenyl)-benztriazole compound which can be substituted in 3'- or 5'-position with the N-methylol compound of the corresponding α,β-alkenoylamide.

The hydroxyl or thiole compounds or primary or secondary amines utilised for addition to the alkenoyl radical are the same as those reacted in the previous process with the halogen acyl radical.

The addition of the organic hydroxyl or thiol compounds or of the primary or secondary amines to these 2-(2'-hydroxy-3'- or -5'-α,β-alkenoylamidomethylphenyl) benztriazole compounds is performed by heating the components, possibly in the presence of organic solvents and, if neutral additives are used, with a basic catalyst, e.g. an alkali metal hydroxide or the hydroxide of a quaternary ammonium base or alkali metal alcoholates or mercaptides.

Depending on their constitution, the new 2-(2'-hydroxy-3'- or 5'-carbacyl amidomethylphenyl)-benztriazole compounds are colourless to slightly yellowish coloured and they absorb UV light well. Compared with previously known compounds of similar constitution they have improved properties for technical application; for example with comparable shade and comparable absorption they have improved fastness to sublimation. The more UV light they absorb the more valuable they are. They are incorporated into light-sensitive carriers in small amounts of 0.001–5%, particularly in amounts of 0.01–2% calculated on the carrier material.

Carriers for the 2-(2'-hydroxy-3'- or 5'-carbacyl amidomethylphenyl)-benztriazole compounds are principally polymers, chiefly completely synthetic polymers e.g. addition polymers, in particular, polymers of compounds having vinylene double bonds such as, e.g. polyvinyl chloride, polyvinylidene chloride, styrene polymers, diene polymers, and also their copolymers, polyethylene, polypropylene, polyacryl compounds, in particular polymethyl methacrylate or polyacrylonitrile, or condensation polymers such as polyesters, e.g. polyethylene glycol terephthalates, or polyamides, e.g. polycaprolactam, or also mixed polymers such as e.g. polyester resins; also natural polymers or synthetic modifications thereof such as, e.g. cellulose, cellulose esters and ethers, and proteins. Additional carriers are also fats, oils and waxes. The molecular weight of the polymers mentioned above plays a subsidiary role as long as its lies within the necessary margins for the characteristic mechanical properties of the polymers concerned. Depending on the polymers, it can be between 1000 and several millions.

The 2-(2'-hydroxy-3'- or -5'-carbacyl amidomethyl phenyl)-benztriazole compounds are incorporated into these polymers—depending on the type of polymers—for example, by working in at least one 2-(2'-hydroxy-3'- or 5'-carbacyl amidomethylphenyl)-benztriazole compound and, possibly, other additives such as, e.g. plasticisers and antioxidants, heat stabilisers and pigments, into the melt by the methods usual in the industry before or during processing, or by dissolving in the corresponding monomers before polymerisation, or by dissolving the polymers and the additives in solvents and subsequently evaporation of the latter. The 2-(2'-hydroxy-3'- or 5'-carbacyl amidomethylphenyl)-benztriazole compounds can also be drawn from baths, e.g. from aqueous dispersions, onto films or threads.

The light-sensitive materials can also be protected from the injurious effect of light by painting with a protective coating, e.g. a lacquer, containing at least one 2-(2'-hydroxycarboxylic acid amidomethylphenyl)-benztriazole compound as defined, or by covering them with advantageously, film-like covers containing such actinic agents. In both these cases the amount of actinic agent to be added is advantageously 10–30% (calculated on the protective covering material) for protective coatings of less than 0.01 mm. thickness and 1–10% for protective coatings of 0.01–0.1 mm. thickness. The more colourless the benztriazole compounds are, the more valuable are they as otherwise they give yellow colourings to the end products.

In non-polar polymers those benztriazole compounds are particularly suitable which themselves contain as few polar groups as possible such as secondary carboxylic acid or sulphonic acid amide groups. In addition, in this case generally products having a low melting point are preferred because of their better solubility.

In general, it is recommended that the possible use of a specific product be estimated by solubility trials. For example, if the product is difficultly soluble, even hot, in the solvents known for the polymers to be protected, then unfavourable results in this polymer are to be expected.

For certain purposes, e.g. when warm chips have to be powdered, products which melt above the softening temperature of the polymers concerned and in spite of this are sufficiently soluble in the melted polymers are particularly valuable.

The following examples illustrate the invention. Where not otherwise stated, parts are given as parts by weight. The temperatures are in degrees centigrade. The relationship of parts by weight to parts by volume is as that of kilograms to litres.

EXAMPLE 1

225 parts of 2-(2'-hydroxy-5'-methylphenyl)-benztriazole are dissolved at room temperature in 500 parts by volume of concentrated sulphuric acid and the solution obtained is cooled to 5–10°. 117 parts of N-methylol-butyric acid amide are added in portions at this temperature while stirring in such a way that the temperature does not rise above 10°. On completion of the addition, stirring is continued for 2 hours at 5–10° and then for 2 hours at 20°. The yellow solution is poured, while stirring well, onto ice. The white precipitate is filtered off under suction and washed neutral with water. The filter cake is boiled out with about 1000 parts by volume of ethanol, cooled, filtered under suction and the product is dried. 315 parts of 2-(2'-hydroxy-3'-butyroylamidomethyl-5'-methylphenyl)-benztriazole are obtained. Recrystallised from chlorobenzene, the product melts at 217°.

In an analogous manner, 2-(2'-hydroxy-3'-butyroylamidomethyl-5'-methylphenyl)-5-ethylsulphonyl-benztriazole is obtained from the corresponding amounts of 2-(2'-hydroxy-5'-methylphenyl)-5-ethylsulphonyl-benztriazole and N-methylolbutyric acid amide, and 2-(2'-hydroxy-3'-butyroylamidomethyl - 5' - methylphenyl) - 4,6 - dichlorobenztriazole is obtained from the corresponding amounts of 2 - (2'-hydroxy-5'-methylphenyl)-4,6-dichlorobenztriazole and N-methylol-butyric acid amide.

The end products mentioned can be used as UV absorbers and, depending on their solubility properties, are suitable as stabilisers for various synthetic materials.

EXAMPLE 2

45 parts of 2-(2'-hydroxy-5'-methylphenyl)-benztriazole are dissolved in 100 parts by volume of concentrated sulphuric acid and 26.2 parts of N-methylol-α,α-dimethylpropionic acid amide are added to the solution obtained under the conditions described in Example 1. Similar to the method described in Example 1, 62 parts of 2-(2'-hydroxy-3'-α,α-dimethylpropionylamidomethyl - 5' - methylphenyl)-benztriazole are obtained. After recrystallisation from ethanol, the product melts at 167°. (2/1)

If instead of the 2-(2'-hydroxy-5'-methylphenyl)-benztriazole, 2-(2'-hydroxy - 5' - amylphenyl) - benztriazole or 2-(2'-hydroxy-5'-bromophenyl)-5,6-dimethyl-benztriazole are used and otherwise the same procedure is followed, then (2/2) 2-(2'-hydroxy - 3' - α,α - dimethylpropionylamidomethyl-5'-amylphenyl)-benztriazole, or (2/3) 2-(2'-hydroxy - 3' - α,α - dimethylpropionylamidomethyl-5'-bromophenyl)-5,6-dimethyl-benztriazole is obtained.

The end products mentioned can be used as UV absorbers and, depending on their solubility properties, are suitable as stabilisers for various synthetic materials.

EXAMPLE 3

22.5 parts or 2-(2'-hydroxy-5'-methylphenyl)-benztriazole are dissolved in 200 parts by volume of concentrated sulphuric acid. After adding 31.4 parts of N-methylol-heptadecane carboxylic acid amide under the conditions described in Example 1 and working up in the same way, 48 parts of 2-(2'-hydroxy-3'-heptadecylcarbamidomethyl-5'-methylphenyl)-benztriazole are obtained. After recrystallising from ethylene glycol monomethyl ether, the product melts at 148°.

In an analogous manner, on using a corresponding amount of 2-(2'-hydroxy-5'-methoxyphenyl)-benztriazole or 2 - (2'-hydroxy-5'-methylphenyl) - 5 - ethyl-benztriazole and N-methylol-heptadecane carboxylic acid amide, 2-(2'-hydroxy-3'-heptadecylcarbamidomethyl - 5' - methoxyphenyl)-benztriazole or 2-(2'-hydroxy-3'-heptadecylcarbamidomethyl - 5' - methylphenyl - 5 - ethyl-benztriazole is obtained.

The end products mentioned can be used as UV absorbers and, depending on their solubility properties, are suitable as stabilisers for various synthetic materials.

EXAMPLE 4

15.1 parts of N-methylolbenzamide are added at 5–10° to a solution of 22.5 parts of 2-(2'-hydroxy-5'-methylphenyl)-benztriazole in 100 parts by volume of concentrated sulphuric acid. After working up as described in Example 1, 34 parts of 2-(2'-hydroxy-3'-benzamidomethyl-5'-methylphenyl)-benztriazole are obtained. After recrystallising from dimethyl formamide, the product melts at 235°.

In an analogous manner, 2-(2'-hydroxy-3'-o-chlorobenzamidomethyl - 5' - methylphenyl)-benztriazole is obtained from 2-(2'-hydroxy-5'-methylphenyl)-benztriazole and N-methylol-o-chlorobenzamide, and 2-(2'-hydroxy-3'-m - methylbenzamidomethyl-5'-methylphenyl) - benztriazole is obtained from 2-(2'-hydroxy-5'-methylphenyl)-benztriazole and N-methylol-m-methylbenzamide.

The end products mentioned can be used as UV absorbers and, depending on their solubility properties, are suitable as stabilisers for various synthetic materials.

EXAMPLE 5

26.7 parts of 2-(2'-hydroxy -5'-tert. butylphenyl)-benztriazole are dissolved in 100 parts by volume of concentrated sulphuric acid and 17.3 parts of N-methylol-α-ethylpentane carboxylic acid amide are added in portions at 5–10° to this solution. On working up, 39.5 parts of 2-(2'-hydroxy-3'-α-ethylpentane carbamidomethyl-5'-tert. butylphenyl)-benztriazole are obtained. After recrystallising from ligroin, the product melts at 146°.

In an analogous manner, 2-(2'-hydroxy-3'-α-ethyl-pentane carbamidomethyl-5'-benzylphenyl)-benztriazole or 2-(2'-hydroxy-3'-α-ethyl-pentane carbamidomethyl-5'-chlorophenyl)-benztriazole are obtained from the corresponding amounts of 2-(2'-hydroxy-5'-benzylphenyl)-benztriazole or 2-(2'-hydroxy-5'-chlorophenyl)-benztriazole and N-methylol-α-ethylpentane carboxylic acid amide.

The end products mentioned can be used as UV absorbers and, depending on their solubility properties, are suitable as stabilisers for various synthetic materials.

EXAMPLE 6

17.3 parts of N-methylol-α-ethylpentane carboxylic acid amide are added in portions at 5–10° to a solution of 29.3 parts of 2-(2'-hydroxy-5'-cyclohexylphenyl)-benztriazole in 100 parts by volume of concentrated sulphuric acid. After working up as described in Example 1, 41 parts of 2-(2'-hydroxy-3'-α-ethylpentane carbamidomethyl-5'-cyclohexylphenyl)-benztriazole are obtained. After recrystallising from ethylene glycol monomethyl ether, the product melts at 192°.

2-(2' - hydroxy-3'-α-ethylpentane carbamidomethyl-5'-phenylphenyl)-benztriazole is obtained in an analogous manner from the corresponding amounts of 2-(2'-hydroxy-5'-phenylphenyl)-benztriazole and N-methylol-α-ethylpentane carboxylic acid amide.

The end products mentioned can be used as UV absorbers and, depending on their solubility properties, are suitable as stabilisers for various synthetic materials.

EXAMPLE 7

22.5 parts of 2-(2'-hydroxy-5'-methylphenyl)-benztriazole are dissolved at room temperature in 75 parts by volume of concentrated sulphuric acid. 15.7 parts of N-methylol-cyclohexane carboxylic acid amide are added in portions within 30 minutes to this solution while stirring at about 20°. On completion of the addition, the whole is stirred for 2 hours at room temperature and then the reaction mixture is poured, while stirring, onto ice. The precipitate formed is filtered off under suction, washed neutral with water and crystallised from ethylene glycol monomethyl ether. The 2-(2'-hydroxy-3'-cyclohexylcarbamidomethyl-5'-methylphenyl)-benztriazole obtained melts at 218°. (7/1)

If instead of N-methylol-cyclohexane carboxylic acid amide, an equivalent amount of N-methylol-phenylacetic acid amide, N-methylol-γ-chlorobutyramide or N-methylol formamide is used then, (7/2) 2-(2'-hydroxy-3'-phenylacetamidomethyl-5'-methylphenyl)-benztriazole,
(7/3) 2-(2'-hydroxy-3'-γ-chlorobutyroylamidomethyl-5'-methylphenyl)-benztriazole, or
(7/4) 2-(2'-hydroxy-3'-formamidomethyl-5'-methylphenyl)-benztriazole is obtained.

The end products mentioned can be used as UV absorbers and, depending on their solubility properties, are suitable as stabilisers for various synthetic materials.

EXAMPLE 8

26 parts of 2-(2'-hydroxy-5'-methylphenyl)-5-chlorobenztriazole are dissolved in 100 parts by volume of concentrated sulphuric acid and 12.3 parts of N-methylol chloracetamide are slowly added at 5–10°. After working up as described in Example 1, 31 parts of 2-(2'-hydroxy-3'-chloroacetamidomethyl - 5' - methylphenyl)-5-chlorobenztriazole are obtained. M.P. 206–207°. (8/1)

If instead of the 2-(2'-hydroxy-5'-methylphenyl)-5-chlorobenztriazole, an equivalent amount of 2-(2'-hydroxy-5'-benzylphenyl)-benztriazole or 2-(2''-hydroxy-5'-methylphenyl)-5-diethylsulphonamido-benztriazole, or 2-(2'-hydroxy-4',5'-dimethylphenyl)-5-bromo - benztriazole is used and otherwise the same procedure is followed, then, (8/2) 2-(2'-hydroxy-3'-chloroacetamidomethyl-5'-benzylphenyl)-benztriazole,
(8/3) 2-(2'-hydroxy-3'-chloroacetamido - 5' - methylphenyl)-5-diethylsulphonamido-benztriazole, or
(8/4) 2-(2' - hydroxy-3'-chloroacetamido-4',5'-dimethylphenyl)-5-bromo-benztriazole is obtained.

The end products mentioned can be used as UV absorbers and, depending on their solubility properties, are suitable as stabilisers for various synthetic materials.

EXAMPLE 9

10.1 parts of N-methylol-acrylic acid amide are slowly added at 5–10° to a solution of 26 parts of 2-(2'-hydroxy-5'-methylphenyl)-5-chlorobenztriazole in 100 parts by volume of concentrated sulfuric acid. On working up, 30 parts of 2-(2'-hydroxy-3'-acryloylamidomethyl-5'-methylphenyl)-5-chlorobenztriazole are obtained. M.P. 226–228°. (9/1)

On using equivalent amounts of the following starting materials:

2-(2'-hydroxy - 5 - methylphenyl)-benztriazole, 2-(2'-hydroxy-5'-methylphenyl)-benztriazole - 5 - sulfonic acid butylamide,
2-(2'-hydroxy-5'-methylphenyl) - 5 - carboxy-benztriazole,
2-(2'-hydroxy-5'-benzylphenyl)-benztriazole,
2-(2'-hydroxy-5'-phenylphenyl)-4-chloro-benztriazole and
2(2'-hydroxy-5'-chlorophenyl)-benztriazole, the following acryloylamides are obtained:

(9/2) 2-(2'-hydroxy-3'-acryloylamidomethyl - 5' - methylphenyl)-benztriazole,
(9/3) 2-(2'-hydroxy-3'-acryloylamidomethyl - 5'-methylphenyl)-benztriazole-5-sulfonic acid butylamide,
(9/4) 2-(2'-hydroxy-3'-acryloylamidomethyl - 5' - methylphenyl)-5-carboxy-benztriazole,
(9/5) 2-(2'-hydroxy-3'-acryloylamidomethyl - 5' - benzylphenyl)-benztriazole,
(9/6) 2-(2'-hydroxy-3'-acryloylamidomethyl - 5' - benzylphenyl)-benztriazole,
(9/7) 2-(2'-hydroxy-3'-acryloylamidomethyl - 5' - phenylphenyl)-4-chlorobenztriazole, and
(9/8) 2-(2'-hydroxy-3'-acryloylamidomethyl - 5' - chlorophenyl)-benztriazole.

The end products mentioned can be used as UV absorbers and, depending on their solubility properties, are suitable as stabilisers for various synthetic materials.

EXAMPLE 10

3 parts of sodium are dissolved in 100 parts by volume of n-butanol. After the addition of 16.5 parts of 2-(2'-hydroxy-3'-chloroacetamidomethyl - 5' - methylphenyl)-benztriazole (M.P. 202°, produced from 2-(2'-hydroxy-5'-methylphenyl)benztriazole and N-methylol chloracetamide), the solution is refluxed for 3 hours. After cooling, the solution is acidified with dilute hydrochloric acid, the excess butanol is removed with steam and the residue is crystallised from dilute methanol. 14.5 parts of 2-((2'-hydroxy-3'-butoxyacetamidomethly - 5' - methylphenyl)-benztriazole are obtained. M.P. 132°. (10/1)

If instead of the 2-(2'-hydroxy - 3' - chloroacetamidomethyl-5'-methylphenyl)-benztriazole, 2 - (2'-hydroxy-3'-chloroacetamidomethyl - 5' - benzylphenyl)-benztriazole, 2-(2'-hydroxy - 3' - chloroacetamidomethyl - 5' - butoxyphenyl) - benztriazole, 2-(2'-hydroxy - 3' - chloroacetamidomethyl - 5' - cyclopentylphenyl)-benztriazole-5-carboxylic acid, 2-(2'-hydroxy - 3' - chloroacetamidomethyl-5'-cyclohexylphenyl)-benztriazole, and otherwise the same procedure is followed, then the following products are obtained:

(10/2) 2-(2'-hydroxy - 3' - butoxyacetamidomethyl-5'-benzylphenyl)benztriazole, (10/3) 2-(2'-hydroxy - 3' - butoxyacetamidomethyl-5'-butoxyphenyl)-benztriazole, (10/4) 2-(2'-hydroxy - 3' - butoxyacetamidomethyl-5'-cyclopentylphenyl)-bentriazole-5-carboxylic acid, (10/5) 2-(2'-hydroxy - 3' - butoxyacetamidomethyl-5'-cyclohexylphenyl)-benztriazole.

The end products mentioned can be used as UV absorbers and, depending on the solubility properties, are suitable as stabilisers for various synthetic materials.

EXAMPLE 11

3 parts of sodium are dissolved in 100 parts by volume of methanol. After addition of 16.5 parts of 2-(2'-hydroxy-3'-chloroacetamidomethyl - 5' - methylphenyl)-benztriazole, the solution is refluxed for 4 hours. After cooling, the solution is acidified with dilute hydrochloric acid and the precipitate formed is filtered off under suction. Recrystallisation from methanol produces 11.5 parts of 2-(2'-hydroxy -3' - methoxyacetamidomethyl-5'-methylphenyl)-benztriazole which melts at 176°.

The same product can be produced in the following way: 45 parts of 2-(2'-hydroxy-5'-methylphenyl)-benztriazole and 23.8 parts of N-methylol-methoxyacetamide (produced by stirring together at 60–70° 89 parts of methoxyacetamide, 30 parts of paraformaldehyde and 1 part of triethylamine) in 100 parts by volume of concentrated sulphuric acid are condensed under the conditions given in Example 1. After recrystallisation from methanol, 58 parts of 2-(2'-hydroxy-3'-methoxyacetamidomethyl-5'-methylphenyl)-benztriazole are obtained. M.P. 176°.

The end product mentioned can be used as UV absorber and, depending on its solutility properties, is suitable as stabiliser for various synthetic materials.

EXAMPLE 12

16.5 parts of 2-(2'-hydroxy-3'-chloroacetamidomethyl-5'-methylphenyl)-benztriazole in 200 parts by volume of ethanol are refluxed for 12 hours with 25 parts of N-methyl-cyclohexylamine. After cooling, the solution is made neutral with acetic acid and diluted with water. The precipitate formed is filtered off under suction and crystallised from methanol. Yield: 16 parts of 2-(2'-hydroxy - 3' - N - methyl - N - cyclohexylamino-acetamidomethyl-5'-methylphenyl)-benztriazole, M.P. 128°.

In an analogous manner, 2-(2'-hydroxy-3'-N,N-dibutylamino-acetamidomethyl - 5' - methylphenyl) - benztriazole, 2-(2'-hydroxy-3'-morpholino - acetamidomethyl-5'-methylphenyl)-benztriazole or 2-(2'-hydroxy-3'-diethanolamino-acetamidomethyl-5'-methylphenyl) - benztriazole is obtained from 2-(2'-hydroxy - 3' - chloroacetamidomethyl-5'-methylphenyl)-benztriazole and dibutylamine, morpholine or diethanolamine.

The end products can be used as UV absorbers and depending on their solubility properties, are suitable as stabilisers for various synthetic materials.

EXAMPLE 13

7.3 parts of n-octylmercaptan and 16.5 parts of 2-(2'-hydroxy-3'-chloroacetamidomethyl - 5' - methylphenyl)-benztriazole (M.P. 202°) are added to a solution of 1.2 parts of sodium in 200 parts by volume of ethanol. After refluxing for 12 hours the mixture is cooled and the precipitate formed is filtered off under suction. Recrystallisation from ethanol produces 19.5 parts of 2-(2'-hydroxy - 3' - octylmercapto-acetamidomethyl - 5' - methylphenyl)-benztriazole, M.P. 128°. (13/1)

If instead of n-octylmercaptan, an equivalent amount of benzylmercaptan or thiophenol is used, then (13/2) 2-(2'-hydroxy-3'-benzylmercapto-acetamidomethyl-5'-methylphenyl)-benztriazole, or (13/3) 2-(2'-hydroxy-3'-phenylmercapto-acetamidomethyl-5'-methylphenyl)-benztriazole is obtained.

The end products mentioned can be used as UV absorbers and, depending on their solubility properties, are suitable as stabilisers for various synthetic materials.

EXAMPLE 14

(14/1) 21.6 parts of sodium methylate are dissolved in 300 parts by volume of ethanol. 21.5 parts of β-mercaptopropionic acid and 66 parts of 2-(2'-hydroxy-3'-chloroacetamidomethyl-5'-methylphenyl) - benzotriazole are added and the whole is refluxed for 12 hours. The solution is acidified with dilute hydrochloric acid and the precipitate formed is filtered off under suction and dried. The crude acid is refluxed for 2 hours with 200 parts by volume of n-butanol whilst simultaneously introducing anhydrous HCl gas and then the excess butanol is slowly distilled off while still introducing HCl gas. The residue is stirred for half an hour with 200 parts by volume of acetone, the precipitate is filtered off under suction and recrystallized from benzene and petroleum ether. In this way, 72 parts of 2-(2'-hydroxy-3'-β-carbobutoxy-ethylmercapto - acetamidomethyl - 5' - methylphenyl)-benzotriazole are obtained, M.P. 120°.

If instead of 2-(2'-hydroxy-3'-chloroacetamidomethyl-5'-methylphenyl)-benzotriazole, an equivalent amount of 2-(2'-hydroxy - 3' - chloroacetamidomethyl - 5' - methylphenyl)-5-carboxybenzotriazole or 2-(2'-hydroxy-3'-chloroacetamidomethyl - 5' - α-phenylethyl-phenyl)-benzotriazole or 2-(2'-hydroxy-3'-chloroacetamidomethyl-5'-bromophenyl)-benzotriazole is used and otherwise the same procedure is followed, then (14/2) 2-(2'-hydroxy - 3' - β - carbobutoxy-ethylmercapto-acetamidomethyl - 5' - methylphenyl) - 5 - carbobutoxy-benzotriazole or (14/3) 2-(2'-hydroxy - 3' - β - carbobutoxy-ethylmercapto-acetamidomethyl - 5' - α - phenylethyl-phenyl)-benzotriazole, are obtained, respectively, and (14/4) 2-(2'-hydroxy - 3' - β - carbooctyloxy-ethylmercapto-acetamidomethyl - 5' - bromophenyl) - benzotriazole, is obtained in the same manner, but esterifying with octanol in lieu of butanol.

The end products mentioned can be used as UV absorbers and, depending on their solubility properties, are suitable as stabilizers for various synthetic materials.

EXAMPLE 15

(15/1) 22.5 parts of 2-(2'-hydroxy-5'-methylphenyl)-benzotriazole are dissolved at room temperature in 75 parts by volume of concentrated sulphuric acid and the solution obtained is cooled to 5–10°. At this temperature, 11.5 parts of N-methylol-methacrylamide are added in portions. On completion of the addition the whole is stirred for 2 hours at 20° and the reaction mixture is poured, while stirring, onto ice. The precipitate obtained is filtered off under suction, washed neutral with water and crystallized from ethylene glycol monomethyl ether. The 2 - (2' - hydroxy - 3' - methacryloylamidomethyl-5'-methylphenyl)-benzotriazole melts at 176°.

If instead of N-methylol-methacrylamide, equivalent amounts of N-methylol-α-phenylacrylamide, N-methylol-α-chloroacrylamide or N-methylol-cinnamic acid amide are used, then (15/2) 2-(2'-hydroxy-3'-α-phenylacryloylamidomethyl-5'-methylphenyl)-benzotriazole,
(15/3) 2-(2'-hydroxy-3'-α-chloroacryloylamidomethyl-5'-methylphenyl)-benzotriazole or
(15/4) 2-(2'-hydroxy-3'-β-phenylacryloylamidomethyl-5'-methylphenyl)-benzotriazole are obtained.

(15/5) 2-(2'-hydroxy - 3' - methacryloylamido-methyl-5'-methylphenyl)-benzotriazole - 5 - carboxylic acid is obtained by repeating Example 15, but using 2-(2'-hydroxy-5'-methylphenyl)-benzotriazole-5-carboxylic acid as starting material in an equivalent amount in lieu of 225 parts of the starting benzotriazole used therein.

The end products mentioned can be used as UV absorbers and, depending on their solubility properties, are suitable as stabilizers for various synthetic materials.

EXAMPLE 16

(16/1) 4 parts of sodium hydroxide, 32.2 parts of 2-(2'-hydroxy-3'-methacryloylamidomethyl - 5' - methylphenyl)-benzotriazole and 14.6 parts of n-octylmercaptan are refluxed for 3 hours in 300 parts by volume of ethanol. After the addition of a little animal charcoal, the reaction mixture is filtered hot and the filtrate is acidified with dilute hydochloric acid. The white precipitate is filtered off under suction, washed with water and, after drying, 41.5 parts of 2-(2'-hydroxy-3'-β-octylmercapto-α-methylpropionylamidomethyl - 5' - methylphenyl)-benzotriazole are obtained. After recrystallization from ethanol, the product melts at 120°.

(16/2) 2-(2'-hydroxy - 3' - β-cyclohexylmercapto-α-methyl-propionyl-amidomethyl - 5' - methylphenyl-benzotriazole-5-carboxylic acid morpholide is obtained by repeating Example 16/1, but using in lieu of the starting benzotriazole, an equivalent amount of 2-(2'-hydroxy-3'-methacryloylamidomethyl - 5' - methylphenyl) - 5 - morpholinocarbonyl-benzotriazole, produced by amidification of the compound of Example 15/5 with morpholine, and further using an equivalent amount of cyclohexylmercaptan in lieu of 14.6 parts of n-octylmercaptan.

(16/3) 2-(2'-hydroxy-5'-β-butylmercapto - α - methyl-propionylamidomethyl-phenyl)-5-methoxy - 6 - methyl-benzotriazole is produced, by following the procedure of Example 16/1, from the final benzotriazole compound of Example 24/1 by reaction with an equivalent amount of butylmercaptan in lieu of 14.6 parts of n-octylmercaptan.

The end product mentioned can be used as UV absorber and, depending on its solubility properties, is suitable as stabilizer for various synthetic materials.

EXAMPLE 17

10 parts of sodium hydroxide, 92.4 parts of 2-(2'-hydroxy-3'-acryloylamidomethyl-5' - methylphenyl)-benzotriazole (M.P. 203°, produced from 2 - (2'-hydroxy-5'-methylphenyl)-benzotriazole and N-methylol-acrylic acid amide) and 25 parts of mercaptoethanol are refluxed for 3 hours in 400 parts by volume of ethanol. After the addition of a little animal charcoal, the reaction mixture is filtered hot, the filtrate is acidified with dilute hydrochloric acid and the white precipitate is filtered off under suction, washed with water and dried. 106 parts of 2-(2'-hydroxy - 3' - β - hydroxyethylmercapto-propionylamidomethyl-5'-methylphenyl)-benzotriazole are so obtained. After recrystallization from ethylene glycol monomethyl ether, the product melts at 164°.

The end product mentioned can be used as UV absorber and, depending on its solubility properties, is suitable as stabilizer for various synthetic materials.

EXAMPLE 18

A solution of 4 parts of sodium hydroxide, 30.8 parts of 2(2'-hydroxy-3'-acryloylamidomethyl - 5' - methylphenyl)-benzotriazole and 11 parts of thiophenol are refluxed for 3 hours in 200 parts by volume of ethanol and, after working up as described in example 16, 38.5 parts of 2-(2'-hydroxy - 3' - β - phenylmercapto-propionylamidomethyl-5'-methylphenyl)-benzotriazole are obtained. Recrystalled from chlorobenzene, it melts at 190°. (18/1)

In an analogous manner, from corresponding amounts of cyclohexylmercaptan, n-butylmercaptan, tert.butylmercaptan, octylmercaptan, dodecylmercaptan or benzylmercaptan and 2-(2'-hydroxy - 3' - acryloylamidomethyl-5'-methylphenyl)-benzotriazole, the following products are obtained:

(18/2) 2-(2'-hydroxy - 3' - β - cyclohexylmercapto-propionylamidomethyl-5'-methylphenyl)-benzotriazole,
(18/3) 2-(2'-hydroxy - 3' - β - butylmercapto-propionylamidomethyl-5'-methylphenyl)-benzotriazole,
(18/4) 2-2'-hydroxy - 3' - β - dodecylmercapto-propionylamidomethyl-5'-methylphenyl)-benzotriazole,
(18/5) 2-(2'-hydroxy - 3' - β - tert.butylmercaptopropionylamidomethyl - 5' - methylphenyl)-benzotriazole, or
(18/6) 2 - (2' - hydroxy-3'-β-benzylmercaptopropionyl amidomethyl - 5' - methylphenyl)-benzotriazole;
(18/7) 2 - (2' - hydroxy-3'-β-butylmercapto-propionyl-amidomethyl-5'-methylphenyl)-benzotriazole - 5 - carboxylic acid, which is obtained from butylmercaptan and, in lieu of the starting benzotriazole used in Example 18/1, an equivalent amount of 2-(2'-hydroxy - 3' - acryloylamidomethyl-5'-methylphenyl)-benzotriazole-5-carboxylic acid;

(18/8) 2-(2'-hydroxy - 3' - β - butylmercapto-propionyl-amidomethyl-5'-benzylphenyl)-benzotriazole, which is obtained from butylmercaptan and, in lieu of the starting benzotriazole used in Example 18/1 an equivalent amout of 2-(2'-hydroxy-3'-acryloylamidomethyl-5'-benzylphenyl)-benzotriazole;

(18/9) 2-2'-hydroxy - 3' - β - butylmercapto-propionyl-amidomethyl-5'-phenylphenyl)-benzotriazole, which is obtained from butylmercaptan and, in lieu of the starting benzotriazole used in Example 18/1, an equivalent amount of 2-(2'-hydroxy-3'-acryloylamidomethyl-5'-phenylphenyl)-benzotriazole;

(18/10) 2-(2'-hydroxy - 3' - β - butylmercaptopropionyl-amidomethyl - 5' - methylphenyl)-benzotriazole-5-sulphonic acid butylamide, which is obtained from butylmercaptan and, in lieu of the starting benzotriazole used in Example 18/1, an equivalent amount of 2-(2'-hydroxy-3'-acryloylamidomethyl-5'-methylphenyl)-benzotriazole-5-sulfonic acid butylamide;

(18/11) 2-(2'-hydroxy - 3' - β - butylmercaptopropionyl-amidomethyl-5'-chlorophenyl)-benzotriazole, which is obtained from butylmercaptan, and, in lieu of the starting benzotriazole used in Example 18/1, an equivalent amount of 2 - (2'-hydroxy-3'-acryloylamidomethyl-5'-chlorophenyl)-benzotriazole; and (18/12) 2(2'-hydroxy - 3' - β - octylmercapto-propionyl-amidomethyl - 5' - methylphenyl)-benzotriazole-5-carboxylic acid diethylamide, which is obtained from octylmercaptan and, in lieu of the starting benzotriazole used in Example 18/1, an equivalent amount of 2-(2'-hydroxy-3'-acryloylamidomethyl-5'- methylphenyl)-benzotriazole-5-carboxylic acid diethylamide.

The end products mentioned can be used as UV absorbers and, depending on their solubility properties, are suitable as stabilizers for a great variety of synthetic materials.

EXAMPLE 19

(19/1) 16 parts of sodium hydroxide, 70 parts of 2-(2'-hydroxy - 3' - acryloylamidomethyl-5'-tert.butylphenyl)-benzotriazole (M.P. 190°, produced from 2-(2'-hydroxy - 5' - tert.butylphenyl)-benzotriazole and N-methylol-acrylic acid amide) and 22 parts of β-mercapto-propionic acid are refluxed for 3 hours in 400 parts by volume of ethanol. On working up as described in Example 16, 84 parts of 2-(2'-hydroxy-3'-β-carboxyethylmercaptopropionylamidomethyl - 5' - tert.butylphenyl)-benzotriazole are obtained. The crude acid is refluxed for 2 hours with 25 parts of cyclohexanol in 400 parts by volume of chlorobenzene whilst simultaneously introducing anhydrous hydrogen chloride and then the chlorobenzene is slowly distilled off while still introducing hydrogen chloride. The residue is stirred for half an hour with 300 parts by volume of petroleum ether and the product is filtered off under suction and dried. Yield: 87 parts of 2-(2'-hydroxy-3'-β-carbocyclohexyloxyethylmercapto - propionylamidomethyl-5'-tert.butylphenyl) - benzotriazole. Recrystallized from benzene and petroleum ether, the product melts at 90°.

(19/2) 2-[2'-hydroxy-3'-β - (β'-carbocyclohexyloxy-ethylmercapto)-propionylamidomethyl-5'-cyclohexylphenyl]-benzotriazole, and (19/3) 2-[2'-hydroxy-3'-β-(carbobutoxy-methylmercapto)-propionyl-amidomethyl-5'-methylphenyl]-benzotriazole, are obtained by repeating Example 19/1, but using in lieu of the starting benzotriazole employed therein, an equivalent amount of the appropriately substituted benzotriazole derivatives, and in the case of compound 19/3, carrying out esterification with an excess of n-butanol in lieu of cyclohexanol.

(19/4) 2-(2'-hydroxy-3'-β-carbethoxy-methylmercapto-propionylamidomethyl-5'-methoxyphenyl)-5-carboethoxy-benzotriazole, is obtained in accordance with the procedure given in Example 19, but replacing the starting benzotriazole by an equivalent amount of 2-(2'-hydroxy - 3' - acryloylamidomethyl-5'-methoxyphenyl)-benzotriazole - 5 - carboxylic acid, and replacing β-mercapto-propionic acid by an equivalent amount of mercapto acetic acid, and then esterifying the resulting benzotriazole di-carboxylic acid derivative with an excess of ethanol in lieu of cyclohexanol.

These products are useful as UV-absorbers and are suitable, depending on their solubility properties, as stabilizers for a variety of synthetic materials.

EXAMPLE 20

22.5 parts of 2-(2'-hydroxy - 5' - methylphenyl)-benztriazole are dissolved in 100 parts by volume of concentrated sulphuric acid and 14.3 parts of N-methylol-caprolactam are added as described in Example 1. On working up, 31.5 parts of 2-[2'-hydroxy-3'-(2''-oxohexamethyleneimidomethyl) - 5' - methylphenyl]-benztriazole are obtained. Recrystallised from ethanol, the product melts at 150°. (Example 20/1.)

If instead of 2-(2'-hydroxy-5'-methylphenyl)-benztriazole, equivalent amounts of 2-(2'-hydroxy-4',5'-dimethylphenyl) - 5 - chlorobenztriazole, 2-(2'-hydroxy-5'-methylphenyl)-5-butoxy-benztriazole, 2 - (2'-hydroxy-5'-methylphenyl)-5-carboxy-benztriazole or 2-(2'-hydroxy-5'-methylphenyl)-5-methylsulphonyl-benztriazole are used, then (20/2) 2-[2'-hydroxy-3'-(2''-oxohexamethyleneimidomethyl)-4',5'-dimethylphenyl]-5-chlorobenztriazole, (20/3) 2-[2'-hydroxy-3'-(2''-oxohexamethyleneimidomethyl)-5'-methylphenyl]-5-butoxy-benztriazole, (20/4) 2-[2'-hydroxy-3'-(2''-oxohexamethyleneimidomethyl)-5'-methylphenyl]-5-carboxy-benztriazole, or (20/5) 2-[2'-hydroxy-3'-(2''-oxohexamethyleneimidomethyl)-5'-methylphenyl]-5-methylsulphonyl-benztriazole is obtained.

The end products mentioned can be used as UV absorbers and, depending on their solubility properties, are suitable as stabilisers for various synthetic materials.

EXAMPLE 21

(21/1) 25.4 parts of 2-(2'-hydroxy-3'-aminomethyl-5'-methylphenyl) - benztriazole (M.P. 148°, obtained by saponification of 2-(2'-hydroxy - 3' - acetamidomethyl-5'-methylphenyl)-benztriazole with alcoholic hydrochloric acid), are dissolved in 200 parts by volume of pyridine and 19 parts of nonane carboxylic acid chlorides are added dropwise to this solution at room temperature. After stirring for 1 hour at room temperature, the pyridine solution is poured into dilute hydrochloric acid, the white precipitate is filtered off under suction and is crystallised from benzene and ligroin. In this way, 32 parts of 2-(2'-hydroxy-3'-nonane carbamidomethyl - 5' - methylphenyl)-benztriazole (M.P. 160°) are obtained.

If 40 parts of nonane carboxylic acid chloride are used instead of the 19 parts and the amount of solvent is increased to 300 parts by volume and if the solution, after standing for 1 hour is kept for 2 hours at 50–60°, then by the method described above, 2-(2'-nonane carbonyloxy-3'-nonane carbamidomethyl-5'-methyl) - benztriazole is obtained. It is heated for 2 hours in a water bath with 100 parts by volume of ethylene glycol monomethyl ether and 20 parts by volume of concentrated sodium hydroxide solution and, after dilution with 200 parts by volume of water and acidification with concentrated hydrochloric acid, the same product as described above is obtained.

On reacting phthalic acid anhydride with the corresponding benztriazole compounds in o-dichlorobenzene, the following products are obtained:

(21/2) 2-(2'-hydroxy-3'-o-carboxybenzoylheptylamidomethyl-4'-chloro-5'-methylphenyl)-benztriazole-5-carboxylic acid diethylamide, and (21/3) 2-(2'-hydroxy-3'-o-carbobutoxybenzoylamidomethyl-5'-methylphenyl)-benztriazole-5-carboxylic acid-N-methylcyclohexylamide, The latter is produced from the corresponding free carboxylic acid by esterification with butanol as described in Example 14.

The end products mentioned can be used as UV absorbers and, depending on their solubility properties, are suitable as stabilisers for various synthetic materials.

EXAMPLE 22

(22/1) 50.8 parts of 2-(2'-hydroxy-3'-aminomethyl-5'-methylphenyl)-benztriazole are refluxed for 2 hours with 20 parts of succinic acid anhydride in 400 parts by volume of chlorobenzene. After cooling, the white precipitate is filtered off under suction and as much moisture as possible is drawn off. The filter residue is dissolved in hot 10% sodium carbonate solution, the yellow solution is filtered and the carboxylic acid is precipitated by acidifying with dilute hydrochloric acid. After filtering off under suction, washing with water and drying, 62 parts of 2-(2'hydroxy-3' - β - carboxypropionylamidomethyl - 5'-methylphenyl)-benztriazole are obtained. The product can be recrystallised from ethylene glycol monomethyl ether when it then melts at 231°.

If with the same components, o-dichlorobenzene is used as solvent instead of chlorobenzene and it is slowly distilled off within about 4 hours and the water which is split off is removed by azeotropic distillation, then 2-(2'-hydroxy - 3'-N-succinylimidomethyl-5'-methylphenyl)-benztriazole is obtained. It melts at over 300°.

If the 2-(2'-hydroxy-3'-β-carboxypropionylamidomethyl-5'-methylphenyl)-benztriazole is esterified with ethanol or butanol then (22/2) 2 - (2' - hydroxy-3'-β-carbethoxypropionylamidomethylphenyl)-benztriazole and (22/3) 2 - (2'-hydroxy-3'-β-carbobutoxypropionylamidomethyl-5'-methylphenyl)-benztriazole, respectively, are obtained.

In an analogous manner, from 2-(2'-hydroxy-3'-aminomethyl-5'-methylphenyl)-benztriazole and maleic acid anhydride, (22/4) 2-(2'-hydroxy-3'-β-carboxy-acryloylamidomethyl-5'-methylphenyl)-benztriazole or, (22/5) on splitting off water and ring closure, 2-(2'-hydroxy - 3'-N-maleinimidomethyl-5'-methylphenyl)-benzotriazole, is obtained.

(22/6) 2 - (2'-hydroxy-3'-β-butylmercapto-β-carbethoxypropionyl - amidomethyl - 5'-amylphenyl)-4,6-dichlorobenzotriazole, (22/7) 2 - (2' - hydroxy-3'-β-butylmercapto-β-carbodecyloxy - propionyl - amidomethyl-5'-phenylphenyl)-4,6-dichlobenzotriazole, and (22/8) 2-[2'-hydroxy-3'-(2'',5''-diketo-3''-butylmercaptopyrrolidinyl - (1'')-methyl)-4',5'-dimethylphenyl]-5-butoxybenzotriazole are obtained, respectively, from the appropriately substituted benzotriazoles, used in equivalent amounts in lieu of the starting benzotriazole of Example 22/1, by following the procedure used in producing compound 22/4, and in the case of compound 22/8, subsequent splitting off of water and ring closure, as in the case of preparing compound 22/5, and finally, in all three cases, condensing the resulting intermediates in strict accordance with the conditions set forth in Example 18/1, but using an equivalent amount of butylmercaptan in lieu of 11 parts of thiophenol and esterification in the case of compound 22/6, with ethanol, and in the case of compound 22/7, with decanol.

The end products mentioned can be used as UV absorbers and, depending on their solubility properties, are suitable as stabilizers for various synthetic materials.

EXAMPLE 23

82.5 parts of o-nitroazo dyestuff obtained by coupling diazotized o-nitroaniline with 2-heptane carboxylic acid amidomethyl-4-methylphenol, are reduced until decoloration occurs with 50 parts of zinc dust in 100 parts of methanol and 50 parts of concentrated sodium hydroxide solution. After recrystallization from benzene and ligroin, 10 parts of 2-(2'-hydroxy-3'-heptane carbamidomethyl-5'-methylphenyl)-benzotriazole are obtained, M.P. 166°. It can be used as UV absorber and, depending on its solubility properties, is suitable as stabilizer for various synthetic materials.

EXAMPLE 24

(24/1) 25.5 parts of 2-(2'-hydroxyphenyl)-5-methoxy-6-methyl-benzotriazole are dissolved in 100 parts by volume of concentrated sulphuric acid. 11.5 parts of N-methylol-methacrylic acid amide are added to this solution as described in Example 1. On working up, 15 parts of 2-(2'-hydroxy-5'-methacryloylamido-methylphenyl)-5-methoxy-6-methyl-benzotriazole are obtained. After recrystallization from methanol, the products melts at 174°.

If instead of N-methylol-methacrylic acid amide, an equivalent amount of N-methylol-butyric acid amide, N-methylol-α,α-dimethylpropionic acid amide, N-methylol-nonane carboxylic acid amide, N-methylol-benzamide, N-methylol-cyclohexane carboxylic acid amide, N-methylol-chloroacetamide, N-methylol-caprolactam or N-methylol-N-methylacetamide, then the following products are obtained:

(24/2) 2 - (2' - hydroxy-5'-butyrylamidomethylphenyl)-5-methoxy-6-methyl-benzotriazole, (24/3) 2 - (2' - hydroxy - 5'-α,α-dimethylpropionylamidomethylphenyl)-5-methoxy-6-methyl-benzotriazole, (24/4) 2-(2'-hydroxy-5'-nonane carbamidomethylphenyl)-5-methoxy-6-methyl-benzotriazole.

(24/5) 2 - (2'-hydroxy-5'-benzamidomethylphenyl)-5-methoxy-6-methyl-benzotriazole, (24/6) 2 - (2'-hydroxy-5'-cyclohexane carbamidomethylphenyl)-5-methoxy-6-methyl-benzotriazole, (24/7) 2-(2'-hydroxy-5'-chloracetamidomethylphenyl)-5-methoxy-6-methyl-benzotriazole, (24/8) 2 - [2' - hydroxy - 5'-(2''-oxohexamethyleneimidomethylphenyl)] - 5-methoxy-6-methyl-benzotriazole, or (24/9) 2-(2'-hydroxy-5'-N-methyl-acetamidomethylphenyl)-5-methoxy-6-methyl-benzotriazole.

The end products mentioned can be used as UV absorbers and, depending on their solubility properties, are suitable as stabilizers for various synthetic materials.

EXAMPLE 25

22.5 parts of 2-(2'-hydroxy-5'-methylphenyl)-benztriazole are dissolved at room temperature in 75 parts by volume of concentrated sulfuric acid and the solution obtained is cooled to 5–10°. At this temperature, 10.3 parts of N-methyl-N-methylol-acetamide are added dropwise within about 1 hour while stirring. On completion of the addition, the whole is stirred for 2 hours at 20° and the sulfuric acid solution is then poured while stirring onto ice. The white precipitate is filtered off under suction and washed neutral with water. After crystallising from ligroin, the 2-(2'-hydroxy-3'-N-methyl-acetamidomethyl-5'-methylphenyl)-benztriazole melts at 134°. (25/1)

In an analogous manner, from 2-(2'-hydroxy-5'-methylphenyl)-benztriazole and corresponding amounts of N-butyl-N-methylol-butyric acid amide, N-octyl-N-methylolacetamide, N - cyclohexyl-N-methylol-acetamide, N-benzyl - N - methylol - butyric acid amide or N - phenyl-N-methylol-acetamide, the following products are obtained:

(25/2) 2 - (2' - hydroxy - 3' - N - butyl - butyrylamidomethyl - 5' - methylphenyl) - benztriazole, (25/3) 2 - (2' - hydroxy - 3' - N - octyl - acetamidomethyl - 5' - methylphenyl) - benztriazole, (25/4) 2 - (2' - hydroxy - 3' - N - benzyl - butyrylamidomethyl - 5' - methylphenyl) - benztriazole, or (25/5) 2 - (2' - hydroxy - 3' - N - phenyl - acetamidomethyl - 5' - methylphenyl) - benztriazole.

The end products mentioned can be used as UV absorbers and, depending on their solubility properties, are suitable as stabilisers for various synthetic materials.

EXAMPLE 26

(a)

(26/1) 3.4 parts of 2-(2'-hydroxy-3'-N-benzyl-aminomethyl-5'-methylphenyl)-benztriazole, 1.6 parts of benzoyl chloride and 1.5 parts of N,N-dimethyl aniline in 20 parts by volume of chlorobenzene are refluxed for half an hour. The solvent is then evaporated off under vacuum and the residue is recrystallised first from ethanol and then from ligroin. The 2-(2'-hydroxy-3'-N-benzylbenzamidomethyl-5'-methylphenyl) - benztriazole obtained melts at 136°.

If instead of benzoyl chloride, an equivalent amount of acetyl chloride, butyryl chloride, nonane carboxylic acid chloride or β-butylmercapto-propionyl chloride is used, then (26/2) 2 - (2' - hydroxy - 3' - N - benzyl - acetamidomethyl - 5' - methylphenyl) - benztriazole, (26/3) 2 - (2' - hydroxy - 3' - N - benzyl - butyrylamidomethyl - 5' - methylphenyl) - benztriazole, (26/4) 2 - (2' - hydroxy - 3' - N - benzyl - nonane carboxylic acid amidomethyl - 5' - methylphenyl) - benztriazole or (26/5) 2 - (2' - hydroxy - 3' - N - benzyl - β - butyl-mercapto - propionylamidomethyl - 5' - methylphenyl)-benztriazole
is obtained.

(b)

The 2 - ( 2' - hydroxy - 3' - N - benzylaminomethyl-5'-methylphenyl)-benztriazole used as starting material is produced in the following manner:

25.4 parts of 2-(2'-hydroxy-3'-aminomethyl-5'-methylphenyl)-benztriazole and 11.6 parts of benzaldehyde in 150 parts by volume of ethylene glycol monomethyl ether are refluxed for half an hour. After cooling, the precipitate is filtered off under suction and recrystallised from ligroin. The 2 - (2' - hydroxy - 3' - N - benzylidene-aminomethyl - 5' - methylphenyl) - benztriazole obtained (M.P. 162°) in 250 parts by volume of dioxane is hydrogenated at room temperature and normal pressure in the presence of 10 parts of Raney nickel and within 22 hours until no more hydrogen is taken up. The Raney nickel is filtered off and the filtrate is concentrated in vacuo. The oily residue is crystallised from ligroin and 2 - (2' - hydroxy - 3' - N - benzylaminoethyl-5'-methyl-phenyl)-benztriazole is obtained. M.P. 80°.

The end products mentioned can be used as UV absorbers and, depending on their solubility properties can be used as stabilisers for various synthetic materials.

(26/6) 2 - (2' - hydroxy - 3' - β - butylmercaptopropionylcyclohexylamidomethyl - 5' - methylphenyl) - benzotriazole is produced from 2-(2'-hydroxy-3'-N-cyclohexylaminomethyl-5'-methylphenyl)-benzotriazole which is in turn produced as described above under Example 26(b), but using in lieu of benzaldehyde an equivalent amount of cyclohexanone, and otherwise following Example 26/1, finally acylating with β-butylmercapto-propionyl chloride as in the case of compound 26/5.

(26/7) 2 - (2' - hydroxy - 3' - [β - (β' - carbethoxy-ethylmercapto) - α - methylpropionyl - N - butylamidomethyl] - 5' - α - phenylethylphenyl) - 4 - chlorobenzotriazole is obtained by first producing 2 - [2' - hydroxy-3' - N - butylaminomethyl - 5' - (α - phenylethyl) - phenyl] - 4 - chloro - benzotriazole in accordance with the procedure of Example 26(b), but starting from 2-[2'-hydroxy - 3' - aminomethyl - 5' - (α - phenylethyl) - phenyl] - 4 - chloro - benzotriazole and an equivalent amount of butyrylaldehyde, in lieu of 11.6 parts of benzaldehyde; the resulting intermediate is then acylated in strict accordance with Example 26(a) with an equivalent amount of α - methyl - β - [β' - (ethoxycarbonyl) - ethyl - mercapto] - propionyl chloride in lieu of 1.6 parts of benzoyl chloride.

(26/8) 2-[2'-hydroxy-3'-β - (β' - carbobutoxy-ethylmercapto) - propionyl - N - heptylamidomethyl-5'-butoxy-phenyl]-5-bromobenzotriazole, is obtained by first producing 2 - (2' - hydroxy - 3' - N - heptylaminomethyl-5'-butoxy-phenyl) - 5 - bromo-benzotriazole in accordance with Example 26(b), but starting from 2-(2'-hydroxy-3'-aminomethyl - 5' - butoxyphenyl) - 5 - bromo-benzotriazole and an equivalent amount of enanthaldehyde in lieu of 11.6 parts of benzaldehyde; the resulting intermediate is then acylated, in strict accordance with Example 26(a), with an equivalent amount of β-[β'-(ethoxycarbonyl)-ethylmercapto]-propionyl chloride, in lieu of 1.6 parts of benzoyl chloride.

(26/9) 2-(2'-hydroxy - 3' - β - butylmercapto-propionyl - N - benzylamidomethyl - 5' - cyclohexylphenyl)-5-chloro-benzotriazole is obtained by first producing 2-(2'-hydroxy-3' - N - benzylaminomethyl-5'-cyclohexylphenyl)-5-chloro-benzotriazole in accordance with Example 26(b), but starting from 2-(2'-hydroxy-3'-aminomethyl-5'-cyclohexyl-phenyl) - 5 - chloro-benzotriazole and 11.6 parts of benzaldehyde; the resulting intermediate is then acylated, in accordance with Example 26(a), with an equivalent amount of β-butylmercapto-propionyl chloride, in lieu of 1.6 parts of benzoyl chloride.

EXAMPLE 27

3.4 parts of 2-(2'-hydroxy-3' - N - benzyl-aminomethyl-5'-methylphenyl)-benztriazole (M.P. 80°) are dissolved in 10 parts by volume of chlorobenzene and 2 parts by volume of N,N-dimethyl aniline. A solution of 1.6 parts of chlorocarbonic acid-butyl ester in 5 parts by volume of chlorobenzene is slowly added dropwise while stirring at room temperature. After stirring for 2 hours at room temperature, the reaction mixture is filtered, the solvent is distilled off in vacuo and the residue is crystallised twice from methanol. 2-(2'-hydroxy - 3' - N - benzyl-carbo-butoxyamidomethyl-5'-methylphenyl) - benztriazole is obtained. M.P. 85°. (27/1)

If instead of chlorocarbonic acid-butyl ester, an equivalent amount of chlorocarbonic acid benzyl ester, cyclohexyl ester or phenyl ester is used, then (27/2) 2-(2'-hydroxy-3'-N-benzyl-carbobenzyloxyamidomethyl-5'-methylphenyl)-benztriazole,
(27/3) 2-(2'-hydroxy-3'-N-benzyl-carbocyclohexyloxyamidomethyl-5'-methylphenyl)-benztriazole, or
(27/4) 2-(2'-hydroxy-3'-N-benzyl-carbophenoxyamidomethyl-5'-methylphenyl)-benztriazole is obtained.

The end products mentioned can be used as UV absorbers and, depending on their solubility properties, are suitable as stabilisers for various synthetic materials.

EXAMPLE 28

3.4 parts of 2-(2'-hydroxy-3' - N - benzylaminomethyl-5'-methylphenyl)-benztriazole are dissolved in 20 parts by volume of chlorobenzene and 5 parts by volume of dimethyl aniline. 1 part of chlorocarbonic acid methyl ester dissolved in 5 parts by volume of chlorobenzene is added dropwise to this solution at room temperature. On completion of the addition, the reaction mixture is heated for 2 hours in a boiling water bath. After cooling, the somewhat opaque reaction solution is filtered and the solvent is removed from the filtrate in vacuo. The product so obtained is recrystallised several times from ethanol. The 2-(2'-hydroxy - 3' - carbomethoxybenzyl-amidomethyl-5'-methylphenyl)-benztriazole melts at 136°. (28/1)

In the same way from corresponding starting materials, the following products are obtained:

(28/2) 2-(2'-hydroxy-3'-carbo-m-methoxyphenoxy-amidomethyl-4'-chlorophenyl)-5-chlorobenztriazole,
(28/3) 2-(2'-hydroxy-3'-carbooctoxyamidomethyl-5'-cyclohexylphenyl)-4,6-dimethylbenztriazole,
(28/4) 2-(2'-hydroxy-3'-carbododecyloxyamidomethyl-5'-methylphenyl)-4,6-dimethyl-benztriazole,
(28/5) 2-(2'-hydroxy-4'-chloro-5'-carbododecyloxy-amidomethylphenyl)-5-butoxy-benztriazole,
(28/6) 2-(2'-hydroxy-4'-methyl-5'-carbomethoxyheptyl-amidomethylphenyl)-5-methoxy-benztriazole,
(28/7) 2-(2'-hydroxy-4'-chloro-5'-carbobenzyloxyamido-methylphenyl)-5-methoxy-benztriazole.

The end products mentioned can be used as UV absorbers and, depending on their solubility properties, are suitable as stabilisers for various synthetic materials.

EXAMPLE 29

100 parts of polyethylene powder (DFD 4400 of Union Carbide International Chemical Company, 30 East 42nd Street, New York, N.Y., USA) are mixed with 0.25 part of 2-(2'-hydroxy - 3' - heptadecylcarbamidomethyl-5'-methylphenyl)-benzitriazole, and the mixture is blown from an extruder into a foil of about 0.06 mm. thickness. Cuttings from this film, which absorbs UV light, were exposed for 250 hours in a Fade-Ometer. The content of stabiliser in the film was determined spectrophotometrically before and after exposure. The loss was 10%. On using other stabilisers, the losses suffered on exposure were determined as given in the following table.

TABLE

| No. | Compound | Loss[1] |
|---|---|---|
| | Comparative compounds without the carboxylic amidomethyl group | |
| 1 | 2-(2'-hydroxy-5'-methylphenyl)-benztriazole | 72 |
| 2 | 2-(2'-hydroxy-5'-tert. butylphenyl)-benztriazole | 50 |
| 3 | 2-(2'-hydroxy-5'-chlorophenyl)-benztriazole | 50 |
| 4 | 2-(2'-hydroxy-3'-tert.butyl-5'-methylphenyl)-benztriazole | 33 |
| 5 | 2-(2'-hydroxy-5'-methylphenyl)-5-chloro-benztriazole | 40 |
| | Compounds according to the invention: | |
| 6 | 2-(2'-hydroxy-3'-heptadecylcarbamidomethyl-5-methylphenyl)-benztriazole | 10 |
| 7 | 2-(2'-hydroxy-3'-octylmercapto-acetamidomethyl-5'-methylphen 1)-benztriazole | 10 |
| 8 | 2-(2'-hydroxy-3'-N-benzyl-carbocyclohexyloxyamidomethyl-5'-methylphenyl)-benztriazole | 12 |
| 9 | 2-(2'-hydroxy-3'-N-octyl-acetamidomethyl-5'-methylphenyl)-benztriazole | 9 |
| 10 | 2-(2'-hydroxy-3'-N-methylcyclohexylaminoacetamidomethyl-5'-methyl)-benztriazole | 10 |

[1] After 250 hours' exposure in fadeometer, percent.

As can be seen from the table, compared with previously known UV absorbers, the compounds according to the present invention suffer considerably less loss on exposure.

This difference is presumably due to the improvement of the fastness to sublimation of the stabilisers according to the invention compared with the comparative substances. If the foil containing the compound 1 in the table is fixed with putty between 2 quartz plates and exposed in the same way, then a loss of only 10% is sustained under these conditions also. The improvement in the sublimation fastness is clearly seen on spinning polypropylene fibres with compound 1: Sublimations are observed on the cold parts of the spinning machine.

On using compound 6 of the table, however, no disturbance can be observed.

EXAMPLE 30

(30/1) Cellulose acetate films were produced by drawing a solution consisting of 150 parts of acetyl cellulose (2½ Acetate of Lonza AG., Weil, Germany, 20 parts of dibutyl phthalate, 825 parts of acetone and 0.5 part of 2-(2'-hydroxy-3'-methoxyacetamidomethyl - 5' - methylphenyl)-benztriazole onto glass. Cuttings from these films were exposed for 1000 hours in a fadeometer and their light absorption at 365 mμ was measured before and after exposure. The transmission before exposure was 10% and after exposure 12%. The loss of content of UV absorber caused by exposure is only 9%. The film so exposed does not show signs of brittleness which are observed in films of the same composition but without stabiliser.

Lightfast UV absorbing films from other cellulose esters which are soluble in acetone can be produced in an analogous way; on using the following substances as actinic agents, results similar to those described above are obtained:

(30/2) 2-(2'-hydroxy-3'-nonane carbamidomethyl-5'-methylphenyl)-benztriazole-5-carboxylic acid butyl ester, (30/3) 2-(2'-hydroxy-3'-N,N-diethylaminoacetamidomethyl-5'-methylphenyl)-benztriazole-5-sulphonic acid diethylamide, (30/4) 2-(2'-hydroxy-3'-nonane carbamidomethyl-5'-methylphenyl)-5-ethyl-sulphonyl-benztriazole, (30/5) 2-(2'-hydroxy-3'-acryloylamidomethyl-5'-methylphenyl)-5-chlorobenztriazole, (30/6) 2-(2'-hydroxy-3'-butyrylamidomethyl-5'-methylphenyl)-benztriazole-5-sulfonic acid-N-methylcyclohexylamide, (30/7) 2-(2'-hydroxy-3'-butoxyacetamidomethyl-5'-methylphenyl)-benztriazole-5-sulfonic acid butylamide, (30/8) 2-(2'-hydroxy-3'-N,N-diethylamino-acetamidomethyl-5'-methylphenyl)-benztriazole-5-carboxylic acid diethylamide, (30/9) 2-(2'-hydroxy-3'-cyclohexylcarbamidomethyl-5'-methylphenyl)-benztriazole-5-carboxylic acid morpholide amide, (30/10) 2-(2'-hydroxy-3'-phenylacetamidomethyl-5'-methylphenyl)-5-carboethoxy-benztriazole.

EXAMPLE 31

(31/1) 100 parts of a usual marketed liquid polyester resin (IC–312 of Interchem. Corporation, New York) are mixed with 0.2 part of the compound 2-[2'-hydroxy-3'-(2''-oxohexamethyleneimidomethyl) - 5' - methylphenyl]-5-chloro-benztriazole (M.P. 116°) and 1 part of benzoyl peroxide and cured at 80° into a form between two glass plates. The 2 mm. thick polyester resin plates formed absorb practically all UV light in the wavelengths under 360 mμ and are substantially stable to yellowing; compared with a plate otherwise the same but produced without stabiliser, only 20% of the loss in transmission occurring at 420 mμ after 500 hours' exposure in the FadeOmeter is determined.

Similar results are obtained on using:

(31/2) 2-(2'-hydroxy-3'-butoxyacetamidomethyl-5'-benzylphenyl)-benztriazole, (31/3) 2-(2'-hydroxy-3'-N,N-dibutylaminoacetamidomethyl-5'-methylphenyl)-benztriazole, (31/4) 2-(2'-hydroxy-3'-N-butyl-butyrylamidomethyl-5'-ethylphenyl)-benztriazole, (31/5) 2-(2'-hydroxy-3'-N-phenyl-acetamidomethyl-5'-methylphenyl)-5-bromo-benztriazole, (31/6) 2-(2'-hydroxy-3'-N-cyclohexyl-acetamidomethyl-5'-methylphenyl)-benztriazole, (31/7) 2-(2'-hydroxy-3'-N-benzyl-carbobenzyloxyamidomethyl-5'-methylphenyl)-benztriazole or (31/8) 2-(2'-hydroxy-5'-N-benzyl-carbomethoxyamidomethyl-methylphenyl)-5-methoxy-6-methyl-benztriazole.

EXAMPLE 32

100 parts of granulated nylon 66 (produced by condensation of hexamethylenediamine and adipic in molar ratio of 1:1 up to about 265° while excluding oxygen) and 0.5 part of 2-(2'-hydroxy-3'-α-ethylpentane carbamidomethyl-5'-tert. butylphenyl)-benztriazole (Example 5) are mixed in the dry state and extruded into a continuous film. The film absorbs ultraviolet light and is suitable for a UV absorbing wrapping material. If instead of nylon 66 another polyamide, e.g. nylon 6 or 11 or a mixed condensate, e.g. 6/10, is used then a similar result is obtained.

EXAMPLE 33

A mixture consisting of 65 parts of polyvinyl chloride, produced by a block polymerisation of polyvinyl chloride with 0.3% of benzoyl peroxide (48 hours at 45–52°), 32 parts of dioctyl phthalate, 2 parts of barium-cadmium laurate and 1 part of a compound according to Example 10 is drawn out at 150° from a set of rollers into a foil. The foil absorbs UV light and, at the same time, is protected from injury by light. It was completely unchanged after 750 hours' exposure in the fadeometer whereas a foil of analogous composition but without UV absorber already had brown spots after 500 hours.

EXAMPLE 34

100 parts of methylmethacrylate, 0.1 part of a compound according to Example 13 and 0.2 part of lauroyl peroxide as polymerisation accelerator are mixed and polymerised at 70° in a glass mould into a plate of 4 mm. even thickness. The plate is explosed for 1000 hours in the fadeometer and the transmission measured at 360 mμ; this is less than 1% and is no different from that before exposure. The plate has neither yellow colouring nor cracks in the surface. This material can therefore, be used as a light-stable UV filter.

EXAMPLE 35

Usual marketed polyacrylonitrile fibres (Orlon 42 of Du Pont, Wilmington, Del., USA) are treated for 30 minutes at 80–100° in a dyebath containing 1% of 2-(2'-hydroxy - 3' - N - methyl - N - cyclohexylamino-acetamidomethyl-5'-methylphenyl)-benztriazole (Example 12) and 4% of formic acid, calculated on the weight of the fibres. The concentration of stabiliser in the liquor was spectrophotometrically determined before and after the dyeing process. It was found that 95% of the absorber had been drawn on to the fibres. The fibres reflected UV light much more weakly than untreated fibres.

We claim:

1. A composition of matter comprising light sensitive organic resinous carrier selected from the group consisting of addition polymers, condensation polymers, mixed condensation and addition polymers, natural polymers, and cellulose esters and ethers, and a compound of the formula

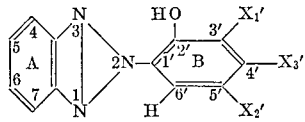

wherein one of $X_1'$ and $X_2'$ is a member selected from the group consisting of radicals of the formulas

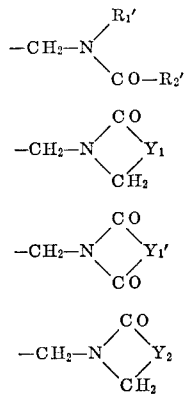

and

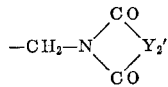

the other $X'$ as well as $X_3'$ being a member selected from the group consisting of hydrogen, alkyl of 1 to 12 carbon atoms, benzyl, phenylethyl, cyclohexyl, cyclopentyl, phenyl, alkoxy with 1 to 4 carbon atoms, chlorine and bromine, $R_1'$ is a member selected from the group consisting of hydrogen alkyl with from 1 to 10 carbon atoms, cycloalkyl of 5 to 8 carbon atoms, mononuclear carbocyclic hydrocarbon aralkyl of 7 to 10 carbon atoms and mononuclear carbocyclic hydrocarbon aryl of 6 to 10 carbon atoms, $R_2'$ is a member selected from the group consisting of hydrogen alkyl with from 1 to 20 carbon atoms, chloroalkyl of 1 to 4 carbon atoms, bromoalkyl of 1 to 4 carbon atoms, alkoxyalkyl of 2 to 10 carbon atoms, mononuclear carbocyclic hydrocarbon aralkoxyalkyl of 8 to 10 carbon atoms, phenyloxyalkyl of 7 to 12 carbon atoms, methylphenyloxyalkyl of 7 to 12 carbon atoms, chlorophenyloxyalkyl of 7 to 12 carbon atoms, alkylmercaptoalkyl of 2 to 14 carbon atoms, cyclohexylmercaptoethyl, benzylmercaptoalkyl of 8 to 10 carbon atoms, phenylmercaptoalkyl of 7 to 10 carbon atoms, aminoalkyl of 2 to 15 carbon atoms, carboxy alkyl with 3 to 6 carbon atoms, alkoxy-carbonyl-alkyl of 4 to 12 carbon atoms, carboxyalkylmercaptoalkyl of 3 to 16 carbon atoms, alkoxycarbonyl alkylmercaptoalkyl of 4 to 15 carbon atoms, cycloalkyloxycarbonylalkylmercaptoalkyl of 8 to 12 carbon atoms, hydroxyalkylmercaptoalkyl of 3 to 6 carbon atoms, alkenyl of 2 to 17 carbon atoms, cycloalkyl of 5 to 8 carbon atoms, mononuclear carbocyclic hydrocarbon aralkyl of 7 to 10 carbon atoms, mononuclear carbocyclic hydrocarbon aralkenyl of 8 to 10 carbon atoms, alkoxy of 1 to 12 carbon atoms, alkylmercaptoalkoxy of 2 to 8 carbon atoms, cycloalkyloxy of 6 to 8 carbon atoms, mononuclear carbocyclic hydrocarbon aralkoxy of 7 to 10 carbon atoms, mononuclear carbocyclic hydrocarbon aryloxy of 6 to 8 carbon atoms, and mononuclear carbocyclic hydrocarbon aryl and mononuclear carbocyclic chloroaryl of a total of 6 to 10 carbon atoms each, each of $Y_1$ and $Y_1'$ is an alkylene radical of 2 to 6 carbon atoms, only 2 carbon atoms of $Y_1'$ being members of the heterocyclic ring in which $Y_1'$ participates, each of $Y_2$ and $Y_2'$ is an alkenylene radical of from 2 to 4 carbon atoms, only 2 carbon atoms of $Y_2'$ being members of the heterocyclic ring in which $Y_2'$ participates, and ring A is a member selected from the group consisting of unsubstituted phenylene and phenylene substituted by a member selected from the group consisting of chlorine; bromine; alkyl of from 1 to 4 carbon atoms; alkoxy of from 1 to 4 carbon atoms; carboxy; alkoxycarbonyl wherein the alkoxy moiety is of 1 to 4 carbon atoms; N-alkyl-substituted carbamyl wherein alkyl has from 1 to 4 carbon atoms; N-alkyl-substituted sulfamyl wherein alkyl has from 1 to 4 carbon atoms; and cyclohexylcarbamyl; said substitution occurring in from one to two of the positions 3, 4 and 5 of ring A, said compound being present at least in sufficient amount to render a film of said composition having a thickness of from 0.01 to 0.1 millimeter UV-dense, while the transparency of said carrier to visible light remains substantially unchanged.

2. A composition of matter as defined in claim 1, the compound of said formula being

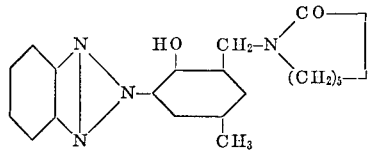

3. A composition of matter as defined in claim 1, the compound of said formula being

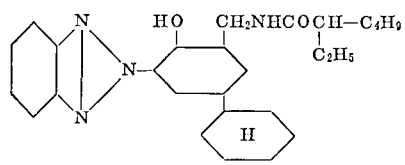

4. A composition of matter as defined in claim 1, the compound of said formula being

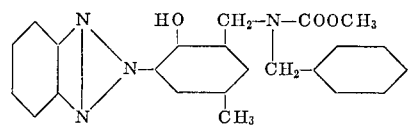

5. A composition of matter as defined in claim 1, the compound of said formula being

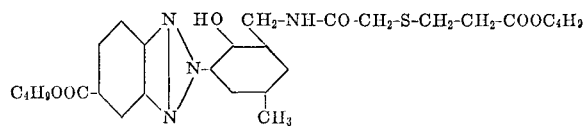

6. A composition of matter as defined in claim 1, the compound of said formula being

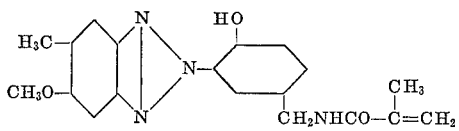

7. A composition of matter as defined in claim 1, the compound of said formula being

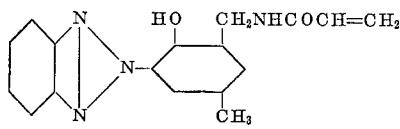

8. A composition of matter as defined in claim 1, the compound of said formula being

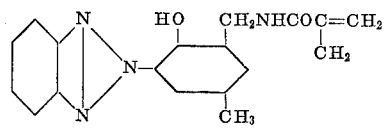

9. A composition of matter as defined in claim 1, the compound of said formula being

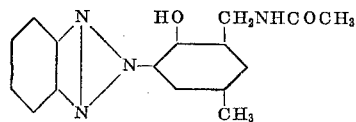

10. A composition according to claim 1, wherein the substrate is an organic polymeric substrate with which at least 0.5% by weight, calculated on the total weight of said composition, of said compound is compatible, said compound rendering the resulting composition substantially impervious to the passage of ultraviolet light in the range of 300 to 350 millimicrons without impairing the normal transparency of said substrate to visible light.

11. A composition according to claim 1, wherein the substrate is a member selected from the group consisting of polyhexamethylene adipic acid amide, polycaprolactam, poly - 11 - aminoundecane acid and polyhexamethylenesebacic acid amide.

12. A composition according to claim 1, wherein the substrate is polyvinyl chloride.

13. A composition according to claim 1, wherein the substrate is polymerized methylmethacrylate.

14. A composition according to claim 1, wherein the substrate is polyacrylonitrile.

References Cited
UNITED STATES PATENTS

| | | | |
|---|---|---|---|
| 3,189,615 | 6/1965 | Heller et al. | 260—308 |
| 3,272,891 | 9/1966 | Milionis et al. | 260—895 |
| 3,337,356 | 8/1967 | Carboni | 106—176 |
| 3,413,227 | 11/1968 | Howard et al. | 252—51.5 |

DONALD E. CZAJA, Primary Examiner

R. A. WHITE, Assistant Examiner

U.S. Cl. X.R.

106—176; 260—800